United States Patent Office 3,022,310
Patented Feb. 20, 1962

---

3,022,310
β-YOHIMBINE AND β-YOHIMBIC ACID 17-ESTERS
Patrick A. Diassi, Westfield, N.J., assignor to Olin Mathieson Chemical Corporation, New York, N.Y., a corporation of Virginia
No Drawing. Filed Dec. 10, 1957, Ser. No. 701,722
6 Claims. (Cl. 260—287)

This invention relates to new compounds, and more particularly to alkaloids, which may be represented by bases of the structural formula

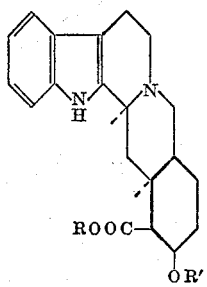

wherein R is hydrogen or lower alkyl, and R' is lower alkanoyl, and acid-addition salts thereof. These compounds have been found to be physiologically active substances which possess andrenolytic activity. Thus, the compounds of this invention can be used in lieu of known adrenolytic compounds such as phentolamine, 2-N-[p'-tolyl - N - (m' - hydroxyphenyl)-aminomethyl]-imidazoline, in the treatment of peripheral vascular diseases, or the diagnosis of pheochromocytoma, for which purpose they are administered perorally or parenterally in the same manner as phentolamine.

The compounds of this invention are prepared by the process of this invention which essentially comprises interacting the β-lactone of yohimbic acid (preparable as described in my U.S. application, Serial No. 673,170, filed July 22, 1957 and now U.S. Patent No. 2,861,075, granted November 18, 1958) with a salt of a lower alkanoic acid in the presence of the free acid (e.g. an alkali metal acetate such as sodium acetate in the presence of glacial acetic acid), the reaction preferably being conducted at an elevated temperature. The process yields the O-(lower alkanoic acid ester) of β-yohimbic acid, which can be esterified in the usual manner as by treatment with a diazo-(lower)alkane (e.g. diazomethane and diazoethane) or a hydrogen halide in a lower alkanol solution.

The free bases initially formed can be converted to their acid-addition salts, particularly the non-toxic acid-addition salts, in the usual manner by treating with the desired acid. Among the suitable acids utilizable in this process may be mentioned inorganic acids, such as the hydrohalic acids (e.g. hydrochloric and hydrobromic acid), sulfuric acid, phosphoric acid, and nitric acid; and organic acids, such as tartaric, succinic, oxalic, maleic and citric acid.

The following examples illustrate the invention:

EXAMPLE 1

*β-Yohimbic acid 17-acetate hydrochloride*

A solution of 2.0 g. (6.1 millimoles) of yohimbic acid β-lactone and 2.0 g. (24.4 millimoles) of anhydrous sodium acetate dissolved in 40 ml. of glacial acetic acid is refluxed under nitrogen for 2½ hours and then left at room temperature overnight. The acetic acid is removed, in vacuo, 75 ml. of water is added to the residue and the solution made alkaline with ammonium hydroxide. The base-insoluble precipitate is filtered off and the basic filtrate, containing β-yohimbic acid 17-acetate, is made strongly acidic with hydrochloric acid whereupon crystals separate. These are filtered and recrystallized from water containing a few drops of hydrochloric acid to give about 635 mg. of β-yohimbic acid 17-acetate hydrochloride, M.P. about 286–288° C., $[\alpha]_D^{23} +99°$ (pyridine).

*Analysis.*—Calcd. for $C_{22}H_{26}O_4N_2 \cdot HCl$ (418.91): C, 63.08; H, 6.50; Cl, 8.46. Found: C, 63.02; H, 6.65; Cl, 9.19. Equivalent weight (perchloric acid titration) 391.

Similarly, by substituting sodium salts of other lower alkanoic acids (e.g. sodium propionate and sodium enanthate) for the sodium acetate in the procedure of Example 1 and conducting the reaction in the presence of the corresponding acid (e.g. propionic acid and enanthic acid), the corresponding 17-lower alkanoate esters are produced.

EXAMPLE 2

*β-Yohimbine 17-acetate*

A solution of 228 mg. (0.545 millimole) of β-yohimbic acid 17-acetate hydrochloride in 20 ml. of methanol is treated with 15 ml. of an ethereal solution of diazomethane (approximate concentration 3 millimole/ml.). After one hour the solution is evaporated nearly to dryness whereupon crystals are formed. They are filtered and recrystallized from methanol to give β-yohimbine 17-acetate, about 175 mg., M.P. about 189–191° C., $[\alpha]_D^{22} +21°$ (pyridine), +17° (abs. ethanol).

*Analysis.*—Calcd. for $C_{23}H_{28}O_4N_2$ (396.47): C, 69.67; H, 7.12; N, 7.07. Found: C, 69.70; H, 6.85; N, 6.91.

EXAMPLE 3

*Ethyl β-yohimbate 17-acetate*

By following the procedure of Example 2, but substituting diazoethane for the diazomethane, ethyl β-yohimbate 17-acetate is obtained.

Similarly, by substituting other 17-esters such as β-yohimbic acid 17-propionate, for the β-yohimbic acid 17-acetate in the procedure of Examples 2 and 3, the corresponding ester derivatives are obtained.

The invention may be otherwise variously embodied within the scope of the appended claims.

What is claimed is:
1. A compound selected from the group consisting of the 17-lower alkanoic acid esters of β-yohimbic acid, the 16-esters thereof with lower alkanols, and therapeutically acceptable acid-addition salts of each of these.
2. β-Yohimbic acid 17-acetate.
3. β-Yohimbic acid 17-acetate hydrochloride, M.P. 286–288° C., $[\alpha]_D^{23} +99°$ (pyridine).
4. β-Yohimbine 17-acetate, M.P. 189–191° C., $[\alpha]_D^{22} +21°$ (pyridine).
5. A process for preparing a compound selected from the group consisting of the 17-lower alkanoic acid esters of β-yohimbic acid and therapeutically acceptable acid-addition salts thereof, which comprises interacting yo- himbic acid β-lactone with a salt of a lower alkanoic acid in the presence of the free acid.

6. The process of claim 5 wherein an alkali metal acetate and acetic acid are employed.

References Cited in the file of this patent

UNITED STATES PATENTS

| | | |
|---|---|---|
| 2,788,347 | MacPhillamy et al. | Apr. 9, 1957 |
| 2,861,075 | Diassi | Nov. 18, 1958 |

OTHER REFERENCES

Beilsteins Handbuch der Org. Chem., 4th ed., 2nd supplement, vol. 25, 1954, pages 205 and 212.

Beilsteins Handbuch der Org. Chem., 4th ed., 2nd work, vol. 25 (1954), page 211.

Godtfredsen et al.: Acta Chemica Scand., vol. II (1957), pages 1013–1016.

Noller: Chemistry of Organic Compounds, page 782 (1957), W. B. Saunders Co.